United States Patent
Chan et al.

(10) Patent No.: US 9,195,288 B2
(45) Date of Patent: Nov. 24, 2015

(54) BATTERY BACKUP SYSTEM AND BATTERY BACKUP MODULE THEREOF

(71) Applicant: DELTA ELECTRONICS, INC., Taoyuan Hsien (TW)

(72) Inventors: Chih-Chiang Chan, Taoyuan Hsien (TW); Miao-Jen Cheng, Taoyuan Hsien (TW); Yu-Chi Jen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 355 days.

(21) Appl. No.: 13/870,667

(22) Filed: Apr. 25, 2013

(65) Prior Publication Data

US 2014/0232350 A1  Aug. 21, 2014

(30) Foreign Application Priority Data

Feb. 19, 2013  (TW) .............................. 102203192 U (51) Int. Cl.
| | |
|---|---|
| H02J 9/00 | (2006.01) |
| H02J 7/00 | (2006.01) |
| H02J 7/04 | (2006.01) |
| H02J 1/00 | (2006.01) |
| G06F 1/26 | (2006.01) |
| G06F 1/18 | (2006.01) |
| G06F 1/30 | (2006.01) |

(52) U.S. Cl.
CPC ................ *G06F 1/263* (2013.01); *G06F 1/188* (2013.01); *G06F 1/30* (2013.01)

(58) Field of Classification Search
CPC ............ G06F 1/263; G06F 1/30; G06F 1/188
USPC .......................... 320/107, 140; 307/64, 66, 82
See application file for complete search history.

(56) References Cited

U.S. PATENT DOCUMENTS

| | | | | |
|---|---|---|---|---|
| 5,612,581 | A * | 3/1997 | Kageyama | H02J 1/102 307/64 |
| 5,739,596 | A * | 4/1998 | Takizawa | G06F 1/263 307/64 |
| 7,863,775 | B2 * | 1/2011 | Oh | 307/66 |
| 8,160,727 | B2 * | 4/2012 | Coonan et al. | 700/22 |
| 8,558,712 | B2 * | 10/2013 | Fechalos et al. | 340/664 |
| 8,633,674 | B2 * | 1/2014 | Law | 320/110 |
| 8,994,276 | B2 * | 3/2015 | Recker et al. | 315/160 |
| 9,007,020 | B2 * | 4/2015 | Prosser et al. | 320/109 |
| 2009/0251007 | A1 * | 10/2009 | Adams et al. | 307/70 |
| 2009/0276104 | A1 * | 11/2009 | Coonan et al. | 700/295 |
| 2013/0093397 | A1 * | 4/2013 | Chan et al. | 320/128 |

\* cited by examiner

*Primary Examiner* — M'Baye Diao
(74) *Attorney, Agent, or Firm* — Kirton McConkie; Evan R. Witt (57) ABSTRACT

A battery backup system includes a base and a plurality of battery backup modules. The base has a plurality of receiving portions. Each of the battery backup modules includes a first modular casing, a microcontroller, an energy storage unit and a DC-DC converting circuit. The microcontroller is disposed in the first modular casing. The energy storage unit is disposed in the first modular casing and connected with the microcontroller for charging or discharging electrical energy. The DC-DC converting circuit is disposed in the first modular casing and connected with the microcontroller for converting a DC voltage. The first modular casing is swappable to be accommodated within one of the receiving portions of the base. When the first modular casing is accommodated within the receiving portion, the energy storage unit is controlled to charge or discharge electrical energy by the microcontroller.

20 Claims, 6 Drawing Sheets

BATTERY BACKUP SYSTEM AND BATTERY BACKUP MODULE THEREOF

FIELD OF THE INVENTION

The present invention relates to a battery backup system, and more particularly to a battery backup system and a battery backup module thereof.

BACKGROUND OF THE INVENTION

With growing of technologies and the Internet, lot types of services are provided through the Internet. In particular, services like cloud computing and cloud storage becomes inseparable from people's daily life. As a result, more and more data center including several computers, servers or workstations are built day by day. The amounts of computers, servers or workstations has to be increased for providing faster and more services and functions of the data center. Meanwhile, the consequent problems of electricity supply and battery power backup appear thereon.

To solve the problems mentioned above, the power distribution units (PDUs) are usually used to distribute electricity required for powering each computer, server or workstation, and the battery backup systems are used for backup power supplying. Under this circumstance, even though the breakdown of utility power occurs, shutdown of data center or damage of equipment still can be avoided.

In general, the specific battery backup units having particular specification are chose to be assembled in conventional battery backup system for meeting the demands of different data centers and further providing specific voltage or current. However, the different battery backup units have different exteriors and sizes, such that the arrangement has to be particularly designed for assembling and installing the battery backup units into the battery backup system. On the other hand, when a battery backup unit of the conventional battery backup system is going to be replaced or maintained, the battery backup system has to be turned off in order to open the housing assembled of the battery backup system. After the maintenance or replacement, the battery backup system is re-assembled and the housing of the battery backup system is closed again, and the battery backup system is finally turned on for providing electricity.

Moreover, for data center operators, when the specific battery backup system is assembled for particular demands, not only the electricity cannot be continuously provided during maintenance or replacement, but also the specification of the battery backup system cannot be adjusted during expansion of the data center. Under this circumstance, the drawbacks of inconvenient maintaining, replacing, assembling and expanding are highlighted, and the operating costs are increased.

There is a need of providing a battery backup system and a battery backup module thereof to obviate the drawbacks encountered from the prior art.

SUMMARY OF THE INVENTION

The present invention provides a battery backup system and a battery backup module thereof in order to eliminate the drawbacks of inconvenient maintaining, replacing, assembling and expanding and further to reduce the operating costs.

The present invention also provides a battery backup system and a battery backup module thereof. A modular battery backup module and a modular casing thereof are swappable, so that the maintenance and replacement of battery backup module are easily implemented through plugging and pulling. Meanwhile, the present invention also achieves the advantages of simplifying assembling and enhancing expandability.

The present invention further provides a battery backup system and a battery backup module thereof. Via plugging and pulling a hot-swappable battery backup module, the battery backup module is maintained or replaced without turning the battery backup system off, so that the operating costs are reduced.

In accordance with an aspect of the present invention, there is provided a battery backup system. The battery backup system includes a base and a plurality of battery backup modules. The base has a plurality of receiving portions. Each of the battery backup modules includes a first modular casing, a microcontroller, an energy storage unit and a DC-DC converting circuit. The microcontroller is disposed in the first modular casing. The energy storage unit is disposed in the first modular casing and connected with the microcontroller for charging or discharging electrical energy. The DC-DC converting circuit is disposed in the first modular casing and connected with the microcontroller for converting a DC voltage. The first modular casing is swappable to be accommodated within one of the receiving portions of the base. When the first modular casing is accommodated within the receiving portion, the energy storage unit is controlled to charge or discharge electrical energy by the microcontroller. A DC voltage inputted to or outputted from the energy storage unit is converted by the DC-DC converting circuit controlled by the microcontroller.

In accordance with another aspect of the present invention, there is provided a battery backup module of a battery backup system comprising a base. The base has a plurality of receiving portions. The battery backup module includes a modular casing, a microcontroller, an energy storage unit and a DC-DC converting circuit. The microcontroller is disposed in the modular casing. The energy storage unit is disposed in the modular casing and connected with the microcontroller for charging or discharging electrical energy. The DC-DC converting circuit is disposed in the modular casing and connected with the microcontroller for converting a DC voltage. The modular casing is swappable to be accommodated within one of the receiving portions of the base. When the modular casing is accommodated within the receiving portion, the energy storage unit is controlled to charge or discharge electrical energy by the microcontroller. A DC voltage inputted to or outputted from the energy storage unit is converted by the DC-DC converting circuit controlled by the microcontroller.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
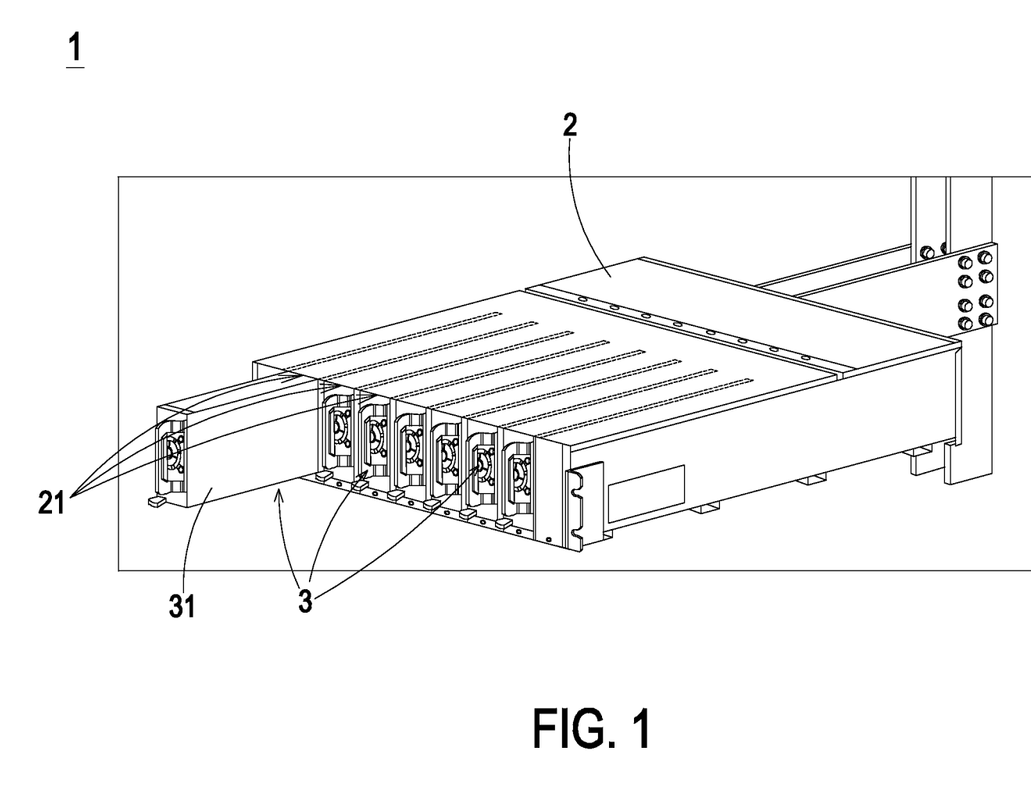
FIG. 1 schematically illustrates the structure of a battery backup system according to an embodiment of the present invention.
Figure 2:
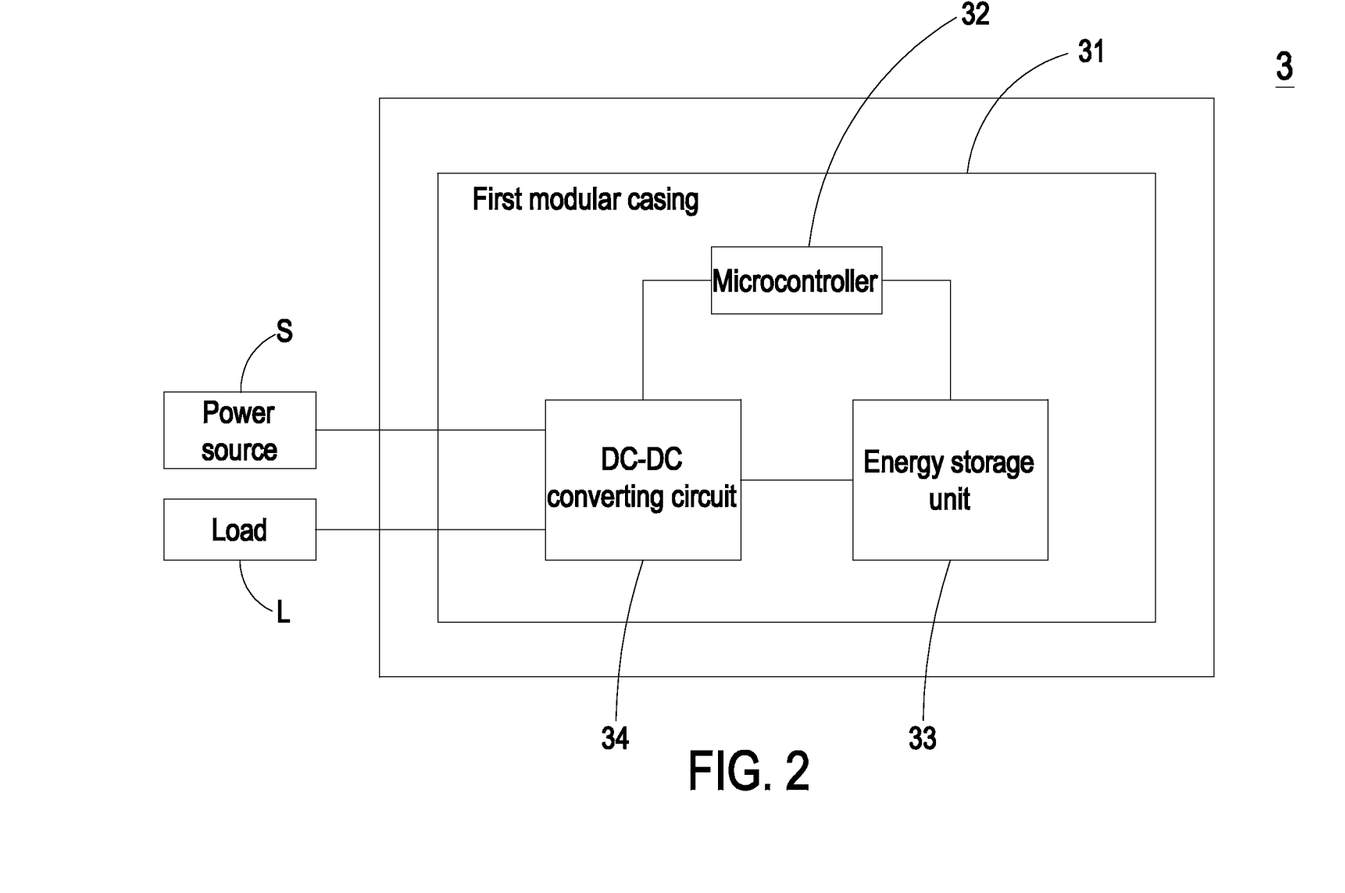
FIG. 2 schematically illustrates the configuration of a battery backup module according to an embodiment of the present invention.

Please refer to FIG. 1 and FIG. 2. FIG. 1 schematically illustrates the structure of a battery backup system according to an embodiment of the present invention. FIG. 2 schematically illustrates the configuration of a battery backup module according to an embodiment of the present invention. The battery backup system 1 of the present invention includes a base 2 and a plurality of battery backup modules 3. The base 2 has a plurality of receiving portions 21, and each of the battery backup modules includes a first modular casing 31, a microcontroller 32, an energy storage unit 33 and a DC-DC converting circuit 34. The microcontroller 32 is disposed in the first modular casing 31. The energy storage unit 33 is disposed in the first modular casing 31 and connected with the microcontroller 32 for charging or discharging electrical energy. The DC-DC converting circuit 34 is disposed in the first modular casing 31 and connected with the microcontroller 32 for converting a DC voltage. In this embodiment, the first modular casing 31 is swappable to be accommodated within one of the receiving portions 21 of the base 2, and the energy storage unit 33 is controlled to charge or discharge electrical energy by the microcontroller 32 when the first modular casing 31 is accommodated within the one of receiving portions 21. A DC voltage inputted to or outputted from the energy storage unit 33 is converted by the DC-DC converting circuit 34 controlled by the microcontroller 32 (e.g. a DC voltage inputted to the energy storage unit 33 by the power source S, or a DC voltage outputted from the energy storage unit 33 and inputted to the power source S). As a result, since the modular battery backup module 3 and the first modular casing 31 thereof are swappable, so that the maintenance and replacement of battery backup module 3 are easily implemented through plugging and pulling. Additionally, the advantages of simplifying assembling and enhancing expandability are also achieved by the present invention.

Figure 3:
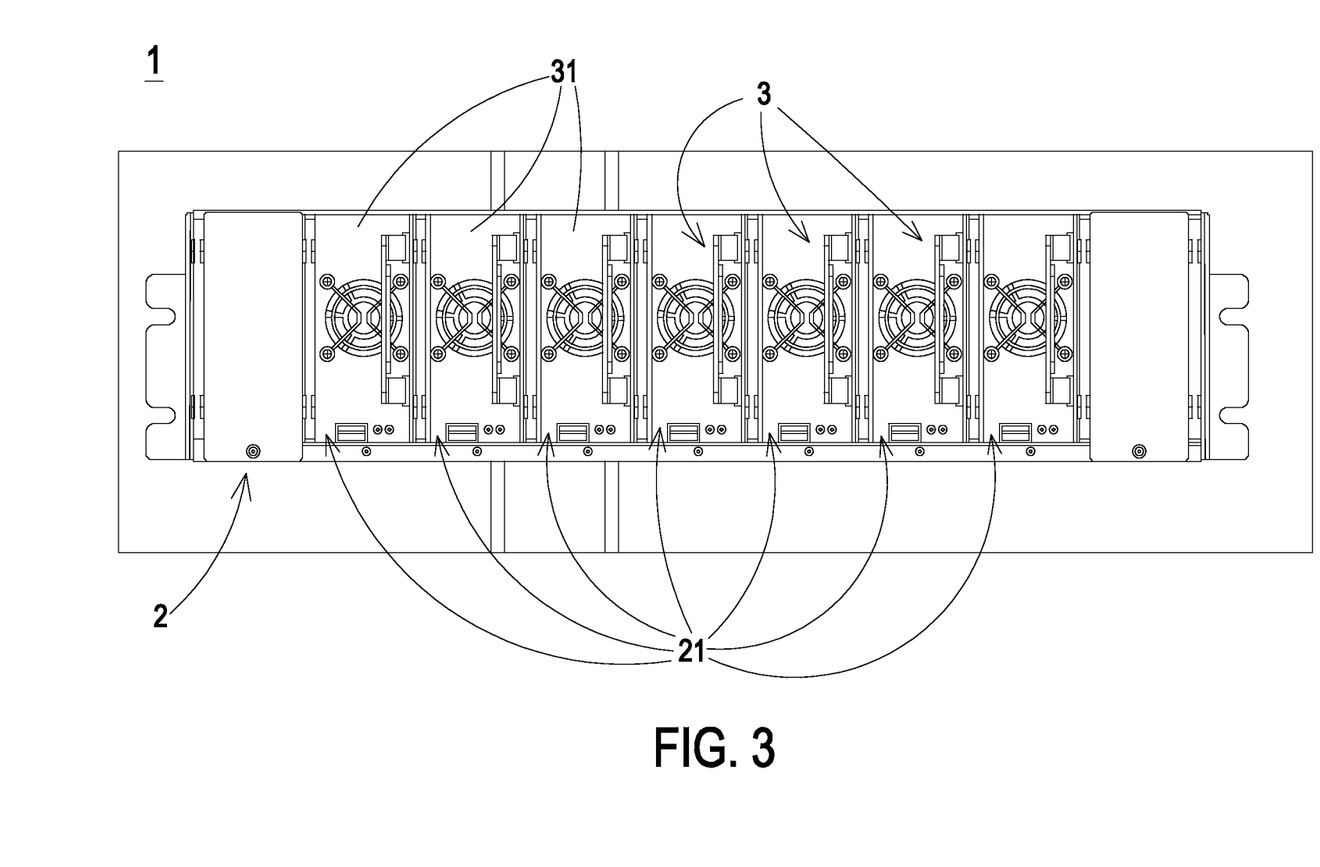
FIG. 3 schematically illustrates a front view of an installed battery backup module as shown in FIG. 1.

Please refer to FIG. 3. FIG. 3 schematically illustrates a front view of an installed battery backup module as shown in FIG. 1. The base 2 of the battery backup system 1 of the present invention has a plurality of receiving portions 21. Each of the receiving portions 21 is used for receiving a first modular casing 31 of the battery backup module 3. The amount of the receiving portions 21 can be varied with the loads of the main circuit (Not shown) connected with the battery backup system 1 or any demands. For example, as shown in FIG. 3, the base 2 has seven receiving portions 21. In some embodiments, via adjusting and designing the amount of the receiving portions 21, a plurality of battery backup modules 3 that provides enough voltages to the loads of the main circuit (e.g. provides 12 volts or 48 volts to the loads) are completely accommodated, but not limited thereto.

Figure 4A:
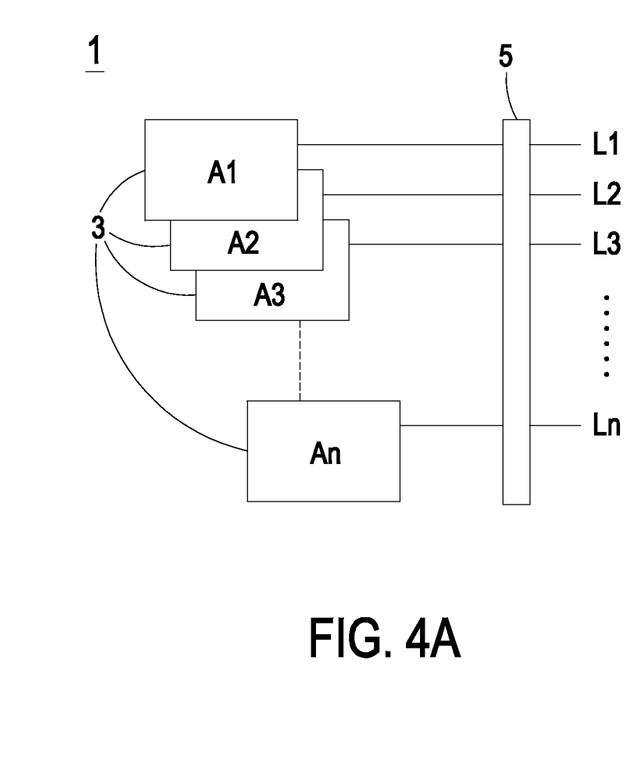
FIG. 4A schematically illustrates the configuration of a battery backup system with the loads applied to of the present invention.
Figure 4B:
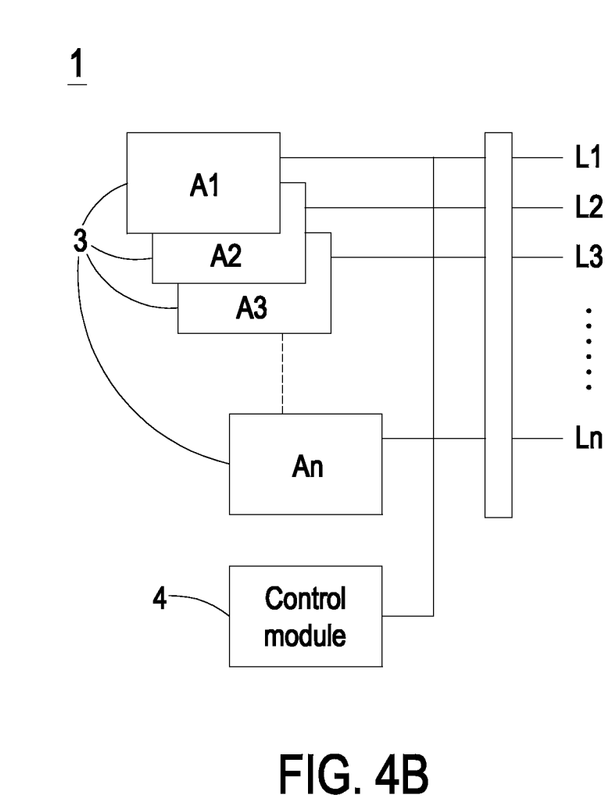
FIG. 4B schematically illustrates the configuration of a battery backup system and a control module thereof with the loads applied to of the present invention.

In some embodiments, the DC voltage is provided and applied to n loads L through setting up n battery backup modules 3. Please refer to FIG. 4A and FIG. 4B. FIG. 4A schematically illustrates the configuration of a battery backup system with the loads applied to of the present invention. FIG. 4B schematically illustrates the configuration of a battery backup system and a control module thereof with the loads applied to of the present invention. The battery backup system 1 of the present invention includes n battery backup modules A1-An for providing the DC voltages required for powering the loads L1-Ln, among which n is a positive integer. The amount of the battery backup modules A1-An and the amount of the loads L1-Ln are identical, and the battery backup modules A1-An are respectively coupled with the loads L1-Ln. In this embodiment, the battery backup modules A1-An can be directly connected with the loads L1-Ln or connected with the loads L1-Ln through a bus 5. When the whole circuit is enable, the connection between the battery backup modules A1-An and the loads L1-Ln and the connection between the battery backup modules A1-An and the bus 5 are electrical connection. In addition, according to the concept of the present invention, the battery backup modules A1-An can be also connected with n power sources so as to be charged, but not limited thereto.

In some embodiments, the battery backup system 1 of the present invention further includes a control module 4 for supervising the operating status of the battery backup system 1 and the detailed factor of the battery backup module 3. For instance, the control module 4 of the battery backup system 1 can be used for supervising the standby mode, the power on mode or the power off mode of the battery backup system 1, supervising current value, voltage value, capacitor value, resistance value, charge cycle, battery health, power efficiency, predicted charging time or predicted discharging time of each battery backup module 3, or even supervising the life and the self-discharging rate of the battery backup module 3.

Figure 5A:
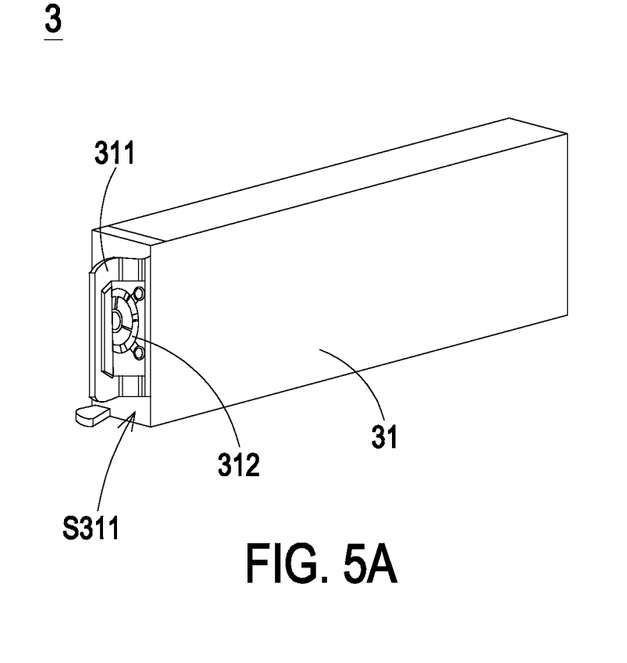
FIG. 5A schematically illustrates the structure of a battery backup module according to an embodiment of the present invention.
Figure 5B:
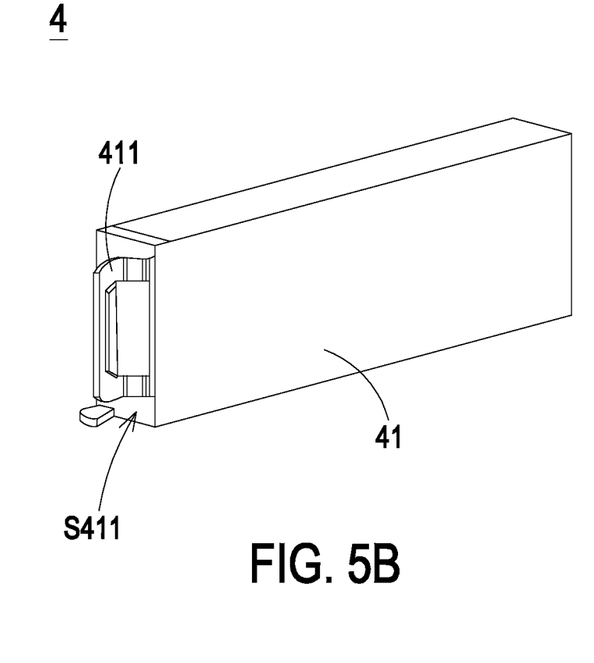
FIG. 5B schematically illustrates the structure of a control module according to an embodiment of the present invention.

Please refer to FIG. 5A and FIG. 5B. FIG. 5A schematically illustrates the structure of a battery backup module according to an embodiment of the present invention. FIG. 5B schematically illustrates the structure of a control module according to an embodiment of the present invention. As shown in FIG. 5A and FIG. 5B, the first modular casing 31 of the battery backup module 3 of the present invention further includes a first grip 311 and heat-dissipating unit 312. The control module 4 includes a second modular casing 41 having the same length, width and height as the first modular casing 31. The second modular casing 41 further includes a second grip 411. The first grip 311 and the second grip 411 are disposed on a first surface S311 of the first modular casing 31 and a first surface S411 of the second modular casing 41, respectively, and respectively extended from the first surface S311 of the first modular casing 31 and the first surface S411 of the second modular casing 41. The first grip 311 and the second grip 411 are provided to be plugged or pulled by the user. On the other hand, the heat-dissipating unit 312 is used for auxiliary heat-dissipating of the components disposed inside the first modular casing 31, and the heat-dissipating unit 312 is not limited to be a heat-dissipating fan or a heat-sink.

In some embodiments, the second modular casing 41 of the control module 4 has the same exterior and size as the first modular casing 31 of the battery backup module 3. The first modular casing 31 and the second modular casing 41 are made from the same mold, such that the same modular battery backup module 3 and control module 4 can be effectively integrated and installed in the battery backup system 1 of the present invention. Therefore, fabricating costs like molding cost and designing cost are greatly reduced.

Figure 6:
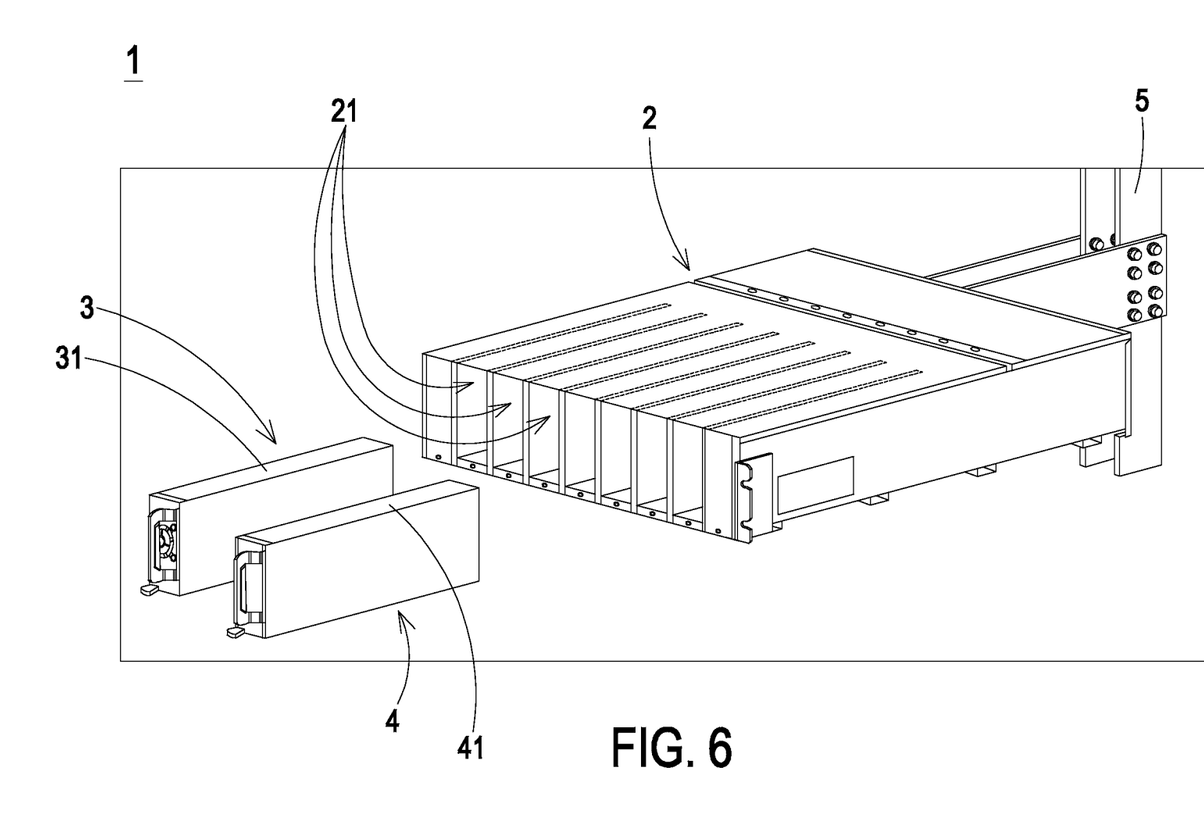
FIG. 6 schematically illustrates the structure of a battery backup system according to another embodiment of the present invention.

Please refer to FIG. 6. FIG. 6 schematically illustrates the structure of a battery backup system according to another embodiment of the present invention. The battery backup module 3 and the control module 4 have the similar modular casings, which are the first modular casing 31 and the second modular casing 41, so each of the receiving portions 21 of the base 2 is used for receiving not only the first modular casing 31 of the battery backup module 3 but also the second modular casing 41 of the control module 4. In other words, both the first modular casing 31 of the battery backup module 3 and the second modular casing 41 of the control module 4 are swappable to be accommodated within one of the receiving portions 21 of the base 2.

Moreover, the operating status and the detailed factor of whole the battery backup system 1 can be effectively supervised by setting up only one control module 4, so that the preferred amount of the control module is equal to 1. In this embodiment, because the base 2 of the battery backup system 1 has seven receiving portions 21, the second modular casing 41 of the control module 4 is received by any one of the receiving portion 21 and the first modular casings 31 of the battery backup modules are received by the other six receiving portions 21 in the preferred embodiment, but not limited thereto.

In some embodiments, the first modular casing 31 and the second modular casing 41 are respectively hot-swappable to be accommodated within one of the receiving portions 21 of the base 2. Under this circumstance, the battery backup module 3 or the control module 4 can be maintained or replaced by the user or the engineer without opening the base 2, and the battery backup module 3 or the control module 4 can be pulled out for replacement and maintenance. In particular, the first modular casing 31 and the second modular casing 41 of the battery backup system 1 of the present are hot-swappable to be plugged or pulled without turning off the power source of the battery backup system, which means that the battery backup system is not required to be shut down. As a result, the operating costs are effectively reduced.

From the above description, the present invention provides a battery backup system and a battery backup module thereof. A modular battery backup module and a modular casing thereof are swappable, so that the maintenance and replacement of battery backup module are easily implemented through plugging and pulling. Meanwhile, the present invention also achieves the advantages of simplifying assembling and enhancing expandability. On the other hand, via plugging and pulling a hot-swappable battery backup module, the battery backup module is maintained or replaced without turning the battery backup system off, so that the operating costs are reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A battery backup system, comprising:
   a base having a plurality of receiving portions; and
   a plurality of battery backup modules, each of said battery backup modules comprises:
   a first modular casing;
   a microcontroller completely disposed in said first modular casing;
   an energy storage unit disposed in said first modular casing and connected with said microcontroller for charging or discharging electrical energy; and
   a DC-DC converting circuit disposed in said first modular casing and connected with said microcontroller and said energy storage unit for converting a DC voltage,
   wherein said first modular casing is swappable to be accommodated within one of said receiving portions of said base, said energy storage unit is controlled to charge or discharge electrical energy by said microcontroller when said first modular casing is accommodated within said receiving portion, and a DC voltage inputted to or outputted from said energy storage unit is converted by said DC-DC converting circuit controlled by said microcontroller.

2. The battery backup system according to claim 1, wherein said first modular casing comprises a first grip disposed on a first surface of said first modular casing and extended from said first surface.

3. The battery backup system according to claim 1 further comprising a control module, wherein said control module comprises a second modular casing, and said second modular casing is swappable to be accommodated within one of said receiving portions of said base.

4. The battery backup system according to claim 3, wherein said first modular casing and said second modular casing are respectively hot-swappable to be accommodated within one of said receiving portions of said base.

5. The battery backup system according to claim 3, wherein said second modular casing has the same length, width and height as said first modular casing.

6. The battery backup system according to claim 3, wherein said second modular casing has the same exterior and size as said first modular casing.

7. The battery backup system according to claim 3, wherein said second modular casing comprises a second grip disposed on a first surface of said second modular casing and extended from said first surface.

8. The battery backup system according to claim 1, wherein said battery backup modules are connected with a plurality of loads for providing DC voltage required for powering said loads, and the amount of said battery backup modules and the amount of said loads are identical.

9. The battery backup system according to claim 8, wherein said battery backup modules are connected with said loads through a bus.

10. A battery backup system, comprising:
    a base having a plurality of receiving portions;
    a plurality of battery backup modules, each of said battery backup modules comprises:
    a first modular casing, wherein said first modular casing is swappable to be accommodated within one of said receiving portions of said base;
    a microcontroller completely disposed in said first modular casing;
    an energy storage unit disposed in said first modular casing and connected with said microcontroller for charging or discharging electrical energy; and a DC-DC converting circuit disposed in said first modular casing and connected with said microcontroller and said energy storage unit for converting a DC voltage; and a control module comprising a second modular casing, wherein said second modular casing is swappable to be accommodated within one of said receiving portions of said base, wherein said energy storage unit is controlled to charge or discharge electrical energy by said microcontroller when said first modular casing is accommodated within said receiving portion, and a DC voltage inputted to or outputted from said energy storage unit is converted by said DC-DC converting circuit controlled by said microcontroller.

11. The battery backup system according to claim 10, wherein said first modular casing and said second modular casing are respectively hot-swappable to be accommodated within one of said receiving portions of said base.

12. The battery backup system according to claim 10, wherein said second modular casing has the same length, width and height as said first modular casing.

13. The battery backup system according to claim 10, wherein said second modular casing has the same exterior and size as said first modular casing.

14. The battery backup system according to claim 10, wherein said first modular casing comprises a first grip disposed on a first surface of said first modular casing and extended from said first surface.

15. The battery backup system according to claim 10, wherein said second modular casing comprises a second grip disposed on a first surface of said second modular casing and extended from said first surface.

16. The battery backup system according to claim 10, wherein said battery backup modules are connected with a plurality of loads for providing DC voltage required for powering said loads, and the amount of said battery backup modules and the amount of said loads are identical.

17. The battery backup system according to claim 16, wherein said battery backup modules are connected with said loads through a bus.

18. A battery backup module of a battery backup system comprising a base, said base has a plurality of receiving portions, comprising:

a modular casing;

a microcontroller completely disposed in said modular casing;

an energy storage unit disposed in said modular casing and connected with said microcontroller for charging or discharging electrical energy; and a DC-DC converting circuit disposed in said modular casing and connected with said microcontroller and said energy storage unit for converting a DC voltage, wherein said modular casing is swappable to be accommodated within one of said receiving portions of said base, said energy storage unit is controlled to charge or discharge electrical energy by said microcontroller when said modular casing is accommodated within said receiving portion, and a DC voltage inputted to or outputted from said energy storage unit is converted by said DC-DC converting circuit controlled by said microcontroller.

19. The battery backup module according to claim 18, wherein said modular casing is hot-swappable to be accommodated within one of said receiving portions of said base.

20. The battery backup module according to claim 18, wherein said modular casing comprises a grip disposed on a first surface of said modular casing and extended from said first surface.

* * * * *